US012783573B2

(12) United States Patent
Suzuki et al.

(10) Patent No.: US 12,783,573 B2
(45) Date of Patent: Nov. 3, 2026

(54) PROCESSING DEVICE, PROCESSING METHOD, AND NON-TRANSITORY COMPUTER-READABLE STORAGE MEDIUM

(71) Applicant: NEC Platforms, Ltd., Kawasaki (JP)

(72) Inventors: Ryo Suzuki, Kanagawa (JP); Ken Tonari, Kanagawa (JP); Takumi Okamura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 212 days.

(21) Appl. No.: 18/586,941

(22) Filed: Feb. 26, 2024

(65) Prior Publication Data

US 2024/0311415 A1 Sep. 19, 2024

(30) Foreign Application Priority Data

Mar. 17, 2023 (JP) ................................ 2023-042958

(51) Int. Cl.
*G06F 16/383* (2019.01)
*G06F 3/08* (2006.01)
(Continued)

(52) U.S. Cl.
CPC .............. *G06F 16/383* (2019.01); *G06F 3/08* (2013.01); *G06F 16/3347* (2019.01); *G06F 18/241* (2023.01); *G06F 18/2413* (2023.01); *G06F 40/268* (2020.01); *G06F 40/30* (2020.01); *G06N 20/00* (2019.01)

(58) Field of Classification Search
CPC ...... G06F 16/383; G06F 3/08; G06F 16/3347; G06F 18/241; G06F 18/2413; G06F 40/268; G06F 40/30; G06N 20/00
See application file for complete search history.

(56) References Cited

U.S. PATENT DOCUMENTS

| | | | | |
|---|---|---|---|---|
| 10,685,183 | B1 * | 6/2020 | Arfa | G06N 3/0499 |
| 10,963,497 | B1 * | 3/2021 | Tablan | G06F 16/3344 |
| 2024/0289395 | A1 * | 8/2024 | Zhou | G06F 16/9532 |

FOREIGN PATENT DOCUMENTS

| | | | |
|---|---|---|---|
| CN | 113297360 | A | 8/2021 |
| JP | 2013-143066 | A | 7/2013 |

(Continued)

OTHER PUBLICATIONS

JP Office Action for JP Application No. 2023-042958, mailed on Apr. 16, 2024 with English Translation.

*Primary Examiner* — Linda Wong
(74) *Attorney, Agent, or Firm* — Sughrue Mion, PLLC

(57) ABSTRACT

A processing device generates, for learning data including a query text, label and reply text, a first sentence vector including a vector about the query text, generates, based on the first sentence vector, a first model that, when the query text is input, outputs a label corresponding to the input query text, divides the learning data for each label, generates a second sentence vector, including vectors for each word, about the query text included in the divided learning data for each label, makes the second sentence vector a second model, generates, based on the first model and the second model, a recommended reply text to a new query text and a reason for recommendation of the recommended reply text, and presents the recommended reply text and the reason for recommendation that were generated.

12 Claims, 10 Drawing Sheets

(51) Int. Cl.

| | |
|---|---|
| ***G06F 16/334*** | (2025.01) |
| ***G06F 18/241*** | (2023.01) |
| ***G06F 18/2413*** | (2023.01) |
| ***G06F 40/268*** | (2020.01) |
| ***G06F 40/30*** | (2020.01) |
| ***G06N 20/00*** | (2019.01) |

(56) References Cited

FOREIGN PATENT DOCUMENTS

| | | | |
|---|---|---|---|
| JP | 2018-185690 | A | 11/2018 |
| JP | 2018-206307 | A | 12/2018 |

* cited by examiner

FIG. 2

| QUERY TEXT (T10) | CLASSIFICATION (T20) | REPLY TEXT (T30) |
|---|---|---|
| I DON'T KNOW HOW TO ENTER BIOS SETTINGS | BIOS | HOLD DOWN F2 DURING STARTUP |
| I WANT TO KNOW HOW TO UPDATE THE BIOS | BIOS | DOWNLOAD THE rom FILE AND ... |
| ... | ... | ... |
| I DON'T KNOW HOW TO CONNECT TO Wi-Fi | WiFi | CLICK THE XX ICON AT THE BOTTOM RIGHT OF THE SCREEN AND ... |
| ... | ... | ... |
| I DON'T KNOW HOW TO USE AN APPLICATION PROGRAM | APP | CLICK THE XX ICON IN THE LOWER LEFT CORNER OF THE SCREEN TO DISPLAY THE APPLICATION PROGRAM LIST AND MAKE A SELECTION |
| ... | ... | ... |

USE FOR FIRST DOCUMENT VECTOR AND SECOND DOCUMENT VECTOR

USE FOR LEARNING OF CLASS CLASSIFIER

USE FOR RECOMMENDATION

FIG. 3

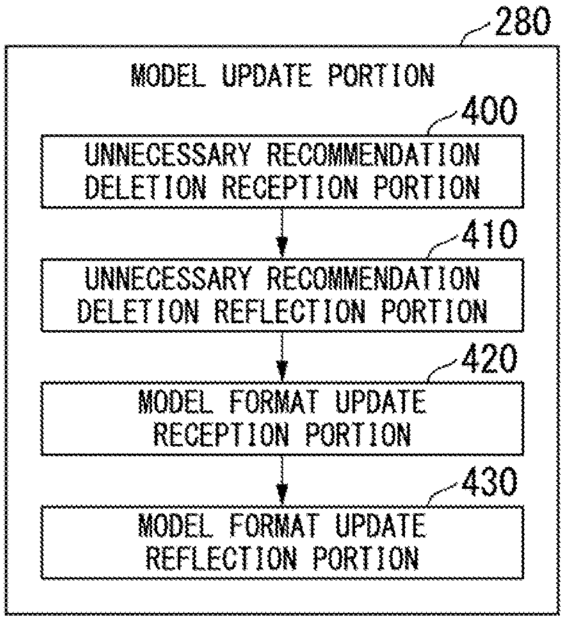

(a)

| FAILURE LOCATION (LABEL) | SIMILARITY |
|---|---|
| PART A | 0.92 |
| PART A | 0.91 |
| PART B | 0.83 |
| PART A | 0.82 |
| PART B | 0.81 |
| PART C | 0.81 |

IDENTICAL LABELS ARE CONSIDERED IDENTICAL
THOSE WITH HIGH SIMILARITY IS OUTPUT
UNDER A DIFFERENT LABEL (b)

| FAILURE LOCATION (LABEL) | SIMILARITY | NO. OF INSTANCES |
|---|---|---|
| PART A | 0.92 | 3 |
| PART B | 0.83 | 2 |
| PART C | 0.81 | 1 |

FIG. 11

| | |
|---|---|
| SIMILARITY RANKING | 1 |
| SIMILARITY | 0.88 |
| PAST QUERY CONTENT | I DON'T KNOW HOW TO ENTER **BIOS SETTINGS** |
| TREATMENT CONTENT | HOLD DOWN F2 DURING STARTUP |

| | |
|---|---|
| SIMILARITY RANKING | 2 |
| SIMILARITY | 0.77 |
| PAST QUERY CONTENT | I WANT TO KNOW HOW TO UPDATE THE **BIOS** |
| TREATMENT CONTENT | PLEASE VISIT THE HOMEPAGE |

| | |
|---|---|
| SIMILARITY RANKING | 3 |
| SIMILARITY | 0.60 |
| PAST QUERY CONTENT | **BIOS** UPDATE FAILED |
| TREATMENT CONTENT | INDICATE XXX |

FIG. 12

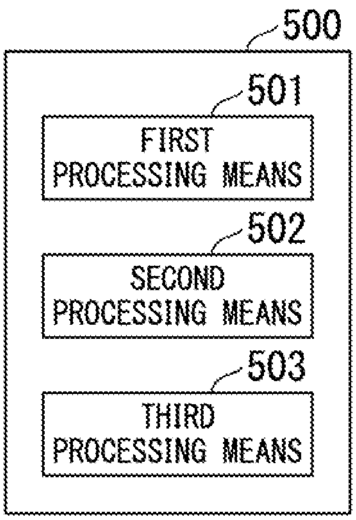

PROCESSING DEVICE, PROCESSING METHOD, AND NON-TRANSITORY COMPUTER-READABLE STORAGE MEDIUM

This application is based upon and claims the benefit of priority from Japanese patent application No. 2023-042958, filed Mar. 17, 2023, the disclose of which is incorporated herein in its entirety by reference.

TECHNICAL FIELD

The present disclosure relates to a processing device, processing method, and a non-transitory computer-readable storage medium.

BACKGROUND ART

With the spread of online shopping and other services, it is expected that there will be more opportunities for users to ask questions of operators and for operators to answer them. Patent Document 1 (Japanese Unexamined Patent Application Publication No. 2013-143066) discloses, as a related technology, a technique for a presentation device that presents a response corresponding to a question.

SUMMARY

One of the objects of each aspect of the present disclosure is to provide a processing device, a processing method, and a non-transitory computer-readable storage medium that can solve the above issue.

In order to achieve the above-mentioned purpose, according to an example of one of the aspects of the present disclosure, the processing device is provided with at least one memory configured to store instructions; and at least one processor configured to execute the instructions to generate, for learning data including a query text, label and reply text, a first sentence vector including a vector about the query text, and generate, based on the first sentence vector, a first model that, when the query text is input, outputs a label corresponding to the input query text; divide the learning data for each label, generate a second sentence vector, including vectors for each word, about the query text included in the divided learning data for each label, and make the second sentence vector a second model; and generate, based on the first model and the second model, a recommended reply text to a new query text and a reason for recommendation of the recommended reply text, and present the recommended reply text and the reason for recommendation that were generated.

In order to achieve the above-mentioned purpose, according to an example of another aspect of the present disclosure, the processing method includes: generating, for learning data including a query text, label and reply text, a first sentence vector including a vector about the query text, and generating, based on the first sentence vector, a first model that, when the query text is input, outputs a label corresponding to the input query text; dividing the learning data for each label, generating a second sentence vector, including vectors for each word, about the query text included in the divided learning data for each label, and making the second sentence vector a second model; and generating, based on the first model and the second model, a recommended reply text to a new query text and a reason for recommendation of the recommended reply text, and presenting the recommended reply text and the reason for recommendation that were generated.

In order to achieve the above-mentioned purpose, according to an example of another aspect of the present disclosure, a non-transitory computer-readable storage medium that stores a program that causes a computer to execute processes. The processes includes: generating, for learning data including a query text, label and reply text, a first sentence vector including a vector about the query text, and generating, based on the first sentence vector, a first model that, when the query text is input, outputs a label corresponding to the input query text; dividing the learning data for each label, generating a second sentence vector, including vectors for each word, about the query text included in the divided learning data for each label, and making the second sentence vector a second model; and generating, based on the first model and the second model, a recommended reply text to a new query text and a reason for recommendation of the recommended reply text, and presenting the recommended reply text and the reason for recommendation that were generated.

BRIEF DESCRIPTION OF THE DRAWINGS

FIG. 2 is a drawing showing an example of response history data in one embodiment of the present disclosure.

FIG. 3 is a drawing showing an example of the configuration of the model update portion according to one embodiment of the present disclosure.

FIG. 11 is a drawing showing an example of a recommendation result in one embodiment of the present disclosure.

FIG. 12 is a drawing showing the minimum configuration of the processing device according to an embodiment of the present disclosure.

EXAMPLE EMBODIMENT

The following is a detailed description of the embodiment with reference to the drawings.

Embodiment

A response system 1 (an example of a processing device) according to one embodiment of the present disclosure is a system that presents recommended reply texts and reasons for recommending the recommended reply texts.

Figure 1:
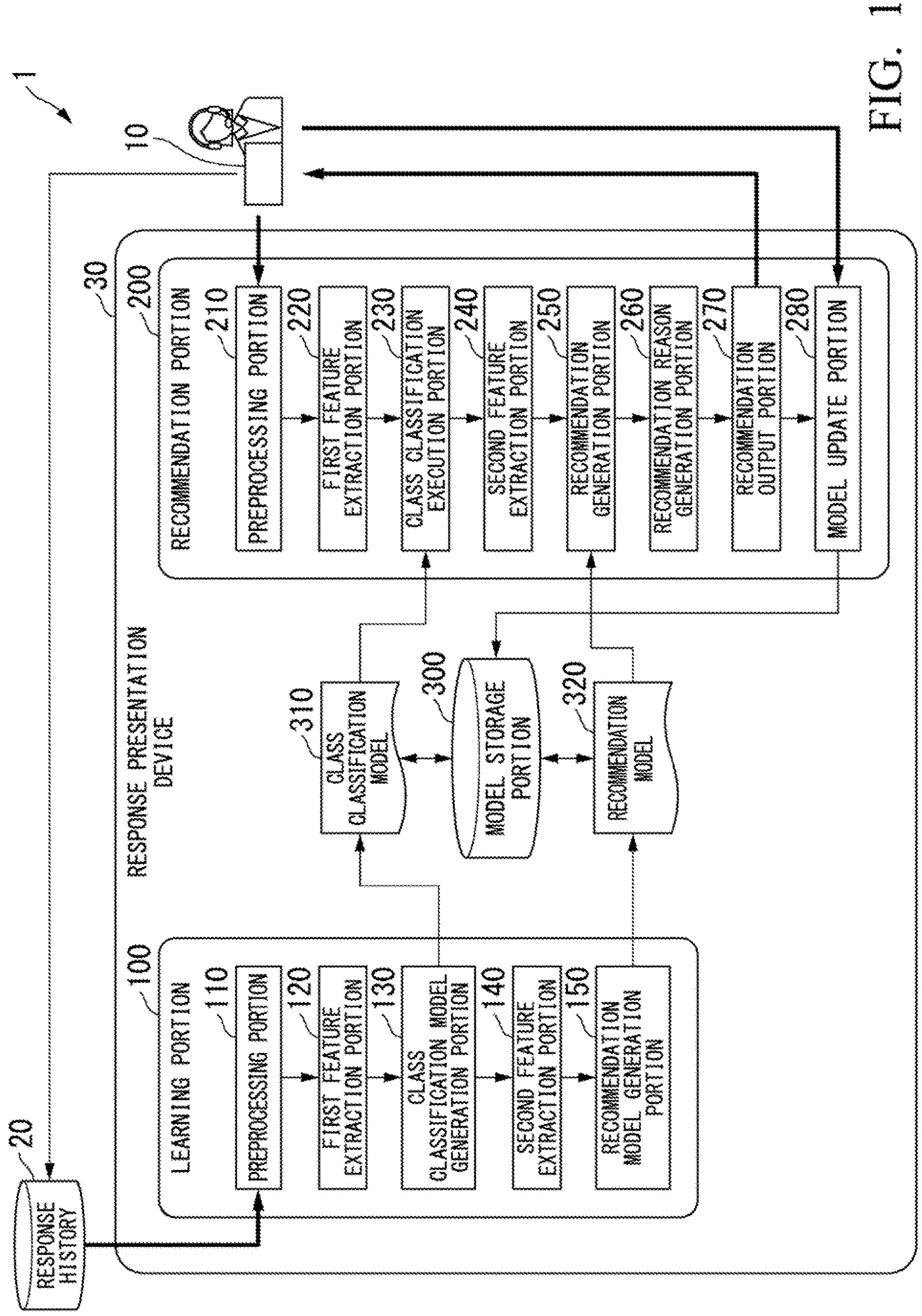
FIG. 1 is a drawing showing an example of the configuration of a response system according to one embodiment of the present disclosure.

FIG. 1 shows an example configuration of a response system 1 according to one embodiment of the present disclosure. As shown in FIG. 1, the response system 1 is equipped with a terminal device 10, a response history database 20 (hereinafter referred to as "response history DB 20"), and a response presentation device 30.

The terminal device 10 is a terminal device operated by call center operators. The terminal device 10 records historical information on questions-and-answers, such as telephone and e-mail responses, by operators, in the response history DB 20.

The response history DB 20 stores historical information on questions-and-answers that operators have responded to. The historical information in the response history DB 20 is accumulated each time an operator performs a question-and-answer session.

The response presentation device 30 is provided with a learning portion 100, a recommendation portion 200, and a model storage portion 300. The learning portion 100 learns a class classifier, which is a class classification model.

The learning portion 100 has a preprocessing portion 110, a first feature extraction portion 120, a class classification model generation portion 130, a second feature extraction portion 140, and a recommendation model generation portion 150, as shown in FIG. 1.

The preprocessing portion 110 obtains all of the query texts T10 in the data in the response history DB 20. The preprocessing portion 110 performs morphological analysis using all the acquired query texts T10.

FIG. 2 shows an example of response history data in one embodiment of the present disclosure. The response history data includes query texts T10, classifications T20, and reply texts T30, as shown in FIG. 2. For example, the query text T10 is a sentence such as "I don't know how to enter BIOS settings," "I want to know how to update the BIOS," "I don't know how to connect Wi-Fi," "I don't know how to use an application program," as shown in FIG. 2. Wi-Fi is a registered trademark. For example, in the case of the aforementioned query text T10, because the query text T10 is related to BIOS, the classification T20 is, as shown in FIG. 2, "BIOS", "Wi-Fi", "application program", and the like. The classification T20 describes major categories of the model name, unit name, function name, failure or defect related to the query text T10. The classification T20 is also called a class label. For example, in the case of the aforementioned query text T10, the reply text T30 is a sentence indicating an answer to the query text such as, "Hold down F2 during startup," "Download the ROM file and . . . ," "Click the XX icon at the bottom right of the screen and . . . ," "Click the XX icon in the lower left corner of the screen to display the application program list and make a selection", and the like. The response history data is used as learning data.

The first feature extraction portion 120 generates a first sentence vector from all the results of morphological analysis by the preprocessing portion 110. Methods for generating the first sentence vector from all morphological analysis results include those using TF-IDF (Term Frequency-Inverse Document Frequency), BERT (Bidirectional Encoder Representations from Transformers), and Word2Vec (Word to Vector). However, the sentence vector may be generated using any method.

The class classification model generation portion 130 learns a class classifier using the first sentence vector generated by the first feature extraction portion 120 and the classification T20 (class label) assigned in the response history DB 20. For example, the class classification model generation portion 130 learns a class classification model so that when the first sentence vector generated by the first feature extraction portion 120 is input to the class classifier, the classification corresponding to that input first sentence vector is output. Class classifiers include SVM (Support Vector Machine) and those using deep learning. However, the class classifier may use any technique. The class classification model generation portion 130 records the generated class classifiers as class classification model 310 in the model storage portion 300.

The second feature extraction portion 140 divides the learning data for each type of the label indicated by the classification T20. For example, in the case of classifications T20 shown in FIG. 2, the second feature extraction portion 140 divides the learning data in accordance with BIOS, Wi-Fi, and application programs. The second feature extraction portion 140 generates a second sentence vector from the morphological analysis result for each of the divided learning data. Methods for generating the second sentence vector from the results of morphological analysis include those using TF-IDF, Word2Vec, etc., similar to the method used to generate the first sentence vector. The second sentence vector may be based on a different method than the first. However, in order to present the reason for recommendation, it is required to use a method of sentence vectors in which words are components, such as TF-IDF vectors. In other words, the first sentence vector is generated for all classifications T20 regardless of label type. In contrast, the second sentence vector is generated for the classification T20 of each label type.

The recommendation model generation portion 150 records the second sentence vector generated by the second feature extraction portion 140 as a recommendation model 320 in the model storage portion 300. In other words, the recommendation model 320 here is a vector.

The recommendation portion 200 recommends a reply text to the new query text. The recommendation portion 200 is provided with a preprocessing portion 210, a first feature extraction portion 220, a class classification execution portion 230, a second feature extraction portion 240, a recommendation generation portion 250, a recommendation reason generation portion 260, a recommendation output portion 270, and a model update portion 280, as shown in FIG. 1.

The preprocessing portion 210 acquires new question-and-answer data input to the response presentation device 30. The preprocessing portion 210 performs morphological analysis using the new query text in the acquired question-and-answer data.

The first feature extraction portion 220 generates a first sentence vector from the results of morphological analysis by the preprocessing portion 210. Sentence vectors include those using TF-IDF, those using BERT, and those using Word2Vec. However, the sentence vector may be one using any method.

The class classification execution portion 230 loads the class classification model 310 stored in the model storage portion 300. The class classification execution portion 230 inputs the first sentence vector generated by the first feature extraction portion 220 into the loaded class classification model 310 to perform class classification.

The second feature extraction portion 240 generates the second sentence vector for the new question-and-answer data acquired by the preprocessing portion 210. The second feature extraction portion 240 can generate a second sentence vector using the same method as the second feature extraction portion 140.

The recommendation generation portion 250 loads the recommendation model 320 stored in the model storage portion 300. The recommendation generation portion 250 calculates the similarity between the second sentence vector corresponding to the class obtained as a result of the class classification performed by the class classification execution portion 230 and the second sentence vector stored in the loaded recommendation model 320. Similarities include cosine similarity, Euclidean norm, and the like. For example, the recommendation generation portion 250 makes the second sentence vector, corresponding to the class obtained as a result of the class classification performed by the class classification execution unit 230, the vector a. The recommendation generation portion 250 also makes the second sentence vector stored in the loaded recommendation model 320 the vector b. The recommendation generation portion 250 then calculates the similarity by performing calculations using the same equations as equations (1) and (2) for generating the information to be presented as the reason for recommendation, as described below. The recommendation generation portion 250 generates the reply text T30 of the response history DB 20 with high similarity as the recommendation information. Regarding the generation of recommendation information, if there are a plurality of instances of the same class label or labels not used for learning with high similarities, it is acceptable to present a representative instance and display how many other occurrences with the same label exist. This allows multiple candidates to be recommended efficiently, and the number of events with the same label can be used as a material to determine the certainty of the recommendation.

The recommendation reason generation portion 260 presents the reason for recommendation by generating information on which words and phrases contributed significantly to the similarity. The generation of information to be presented as a reason for recommendation by the recommendation reason generation portion 260 is described here.

First, an example of generating information to be presented as a reason for recommendation when cosine similarity is used as the similarity is described.

The cosine value between vectors a and vectors b is expressed as in Equation (1).

[Equation 1]

$$\cos(a, b) = \frac{a \cdot b}{|a||b|} = \frac{\sum_i a_i b_i}{\sqrt{\sum_i a_i^2}\sqrt{\sum_i b_i^2}} \tag{1}$$

Here, let vector a be the second sentence vector for the new question-and-answer data and vector b be the second sentence vector generated from the recommendation model 320. In this case, the cosine value can be treated as the similarity between sentences.

Here, attention is paid to each term $a_i b_i$ of the numerator on the right-hand side of Equation (1). The subscript i in each term $a_i b_i$ represents the element number of the vector. Each term $a_i b_i$ corresponds to a word or phrase such as “BIOS,” “setting,” “how to enter,” etc., in the case of a sentence vector such as TF-IDF. By rearranging and extracting these terms in numerical order, and presenting the corresponding words or phrases and their numerical values in, for example, tabular form, it is possible to inform the operator through the terminal device 10 about which words or phrases led to the recommendation. Additionally, displaying the value of each term divided by the cosine value allows presenting them as contribution ratios.

Next, an example of generating information to be presented as a reason for recommendation when the Euclidean norm is used as the similarity level is described.

The Euclidean norm between vectors a and vectors b is expressed as in Equation (2).

[Equation 2]

$$d(a, b) = \sqrt{\sum_i (a_i - b_i)^2} \tag{2}$$

Similarity using the Euclidean norm differs from cosine similarity in that the smaller the value, the closer the distance between vectors. Therefore, in similarity using the Euclidean norm, smaller values are treated as higher similarity. This allows us to present words and phrases that have a small value of $a_i - b_i$ on the right side in Equation (2) and that correspond to $a_i \neq 0$ and $b_i \neq 0$ as words and phrases with a high contribution to similarity.

The recommendation output portion 270 formats the recommendation information generated by the recommendation generation portion 250 and the reason for recommendation generated by the recommendation reason generation portion 260. The recommendation output portion 270 outputs the formatted recommendation information and the formatted reason for recommendation as recommendation results.

FIG. 3 shows an example of the configuration of the model update portion 280 according to one embodiment of the present disclosure. As shown in FIG. 3, the model update portion 280 is provided with an unnecessary recommendation deletion reception portion 400, an unnecessary recommendation deletion reflection portion 410, a model format update reception portion 420, and a model format update reflection portion 430.

The unnecessary recommendation deletion reception portion 400 accepts input from the terminal device 10 regarding the presence or absence of useful/unnecessary recommendation information through operation of the terminal device 10 by the operator.

If the unnecessary recommendation deletion reception portion 400 received unnecessary recommendation information as a result of input from the terminal device 10, the unnecessary recommendation deletion reflection portion 410 deletes the unnecessary recommendation data from the recommendation model 320. Then, the unnecessary recommendation deletion reflection portion 410 terminates reception of input from the terminal device 10.

If the unnecessary recommendation deletion reception portion 400 did not receive unnecessary recommendation information as a result of input from the terminal device 10, the unnecessary recommendation deletion reflection portion 410 terminates reception of input from the terminal device 10.

The model format update reception portion 420 receives the addition of content in accordance with the new format for recommendations that have been useful.

The model format update reflection portion 430 reflects the content in accordance with the new format received by the model format update reception portion 420 in the recommendation model 320 in the model storage portion 300.

If there are no useful recommendations or no additions of content in accordance with the new format, the model format update reflection portion 430 terminates the process as is. Thereby, events that have a proven track record of recommendation and are useful are preferentially updated in accordance with the new format. Then, a new machine learning model can be re-generated at the timing when updated data is accumulated according to the new format.

The model storage portion 300 stores the class classification model 310 generated by the class classification model generation portion 130 of the learning portion 100 and the recommendation model 320 generated by the recommendation model generation portion 150 of the learning portion 100.

Figure 4:
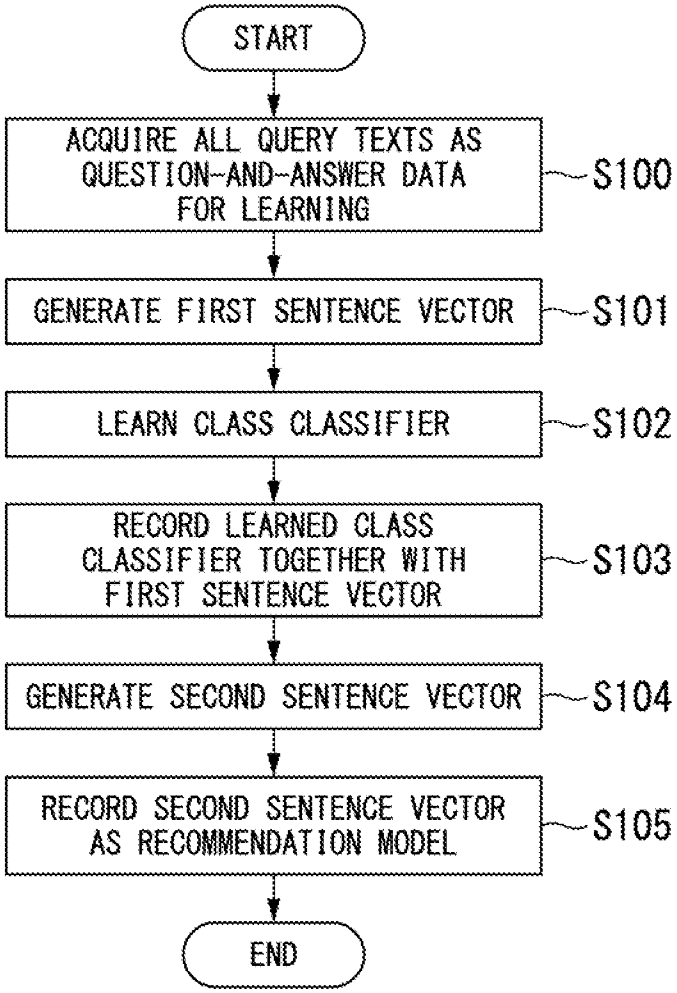
FIG. 4 is a drawing showing a first example of the processing flow of the response system according to one embodiment of the present disclosure.
Figure 5:
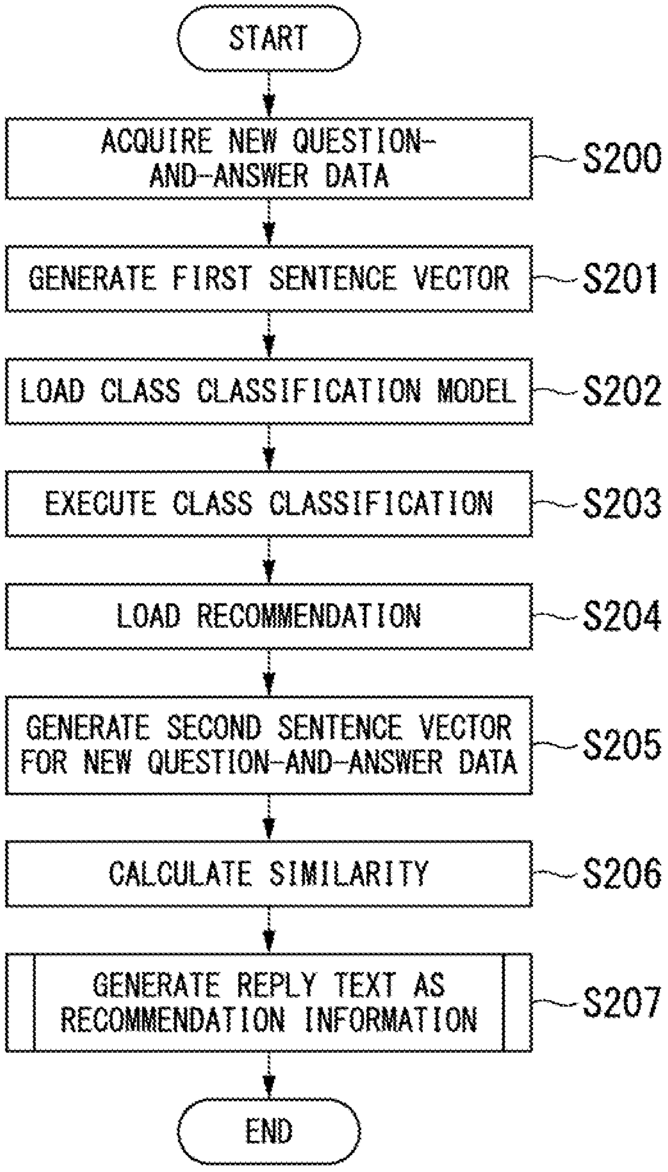
FIG. 5 is a drawing showing a second example of the processing flow of the response system according to one embodiment of the present disclosure.
Figure 6:
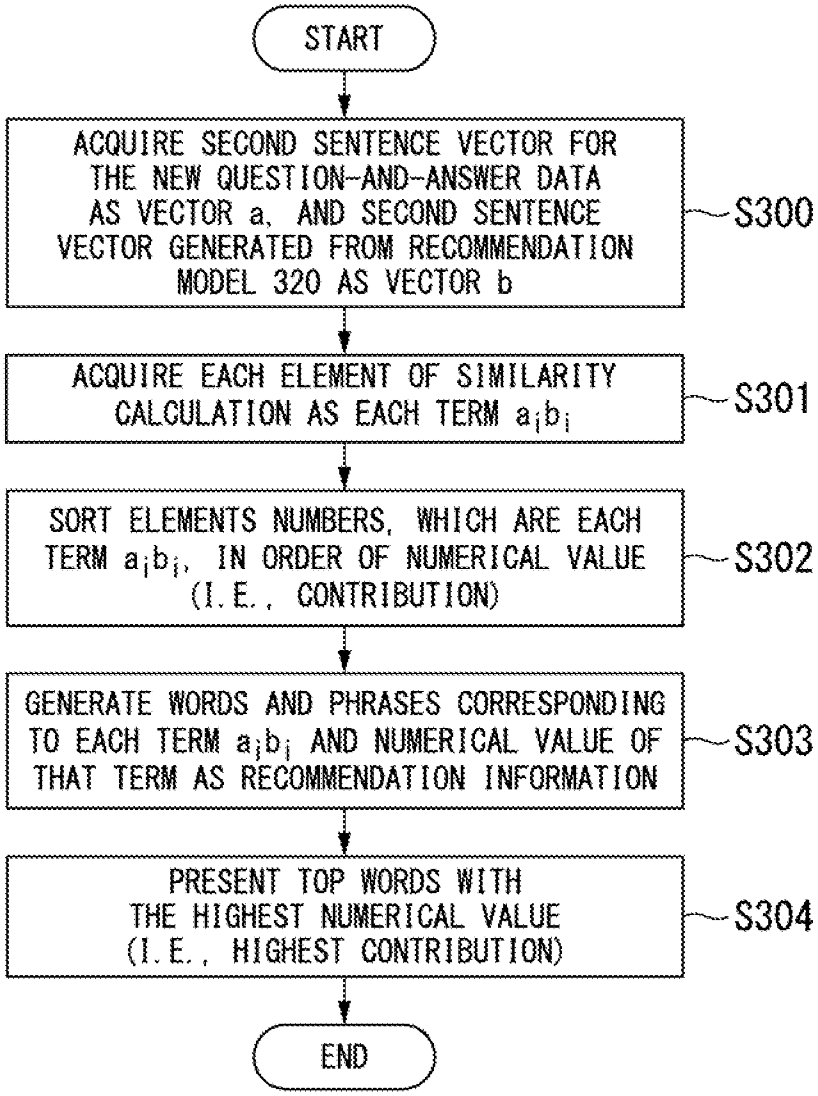
FIG. 6 is a drawing showing a third example of the processing flow of the response system according to one embodiment of the present disclosure.
Figure 7:
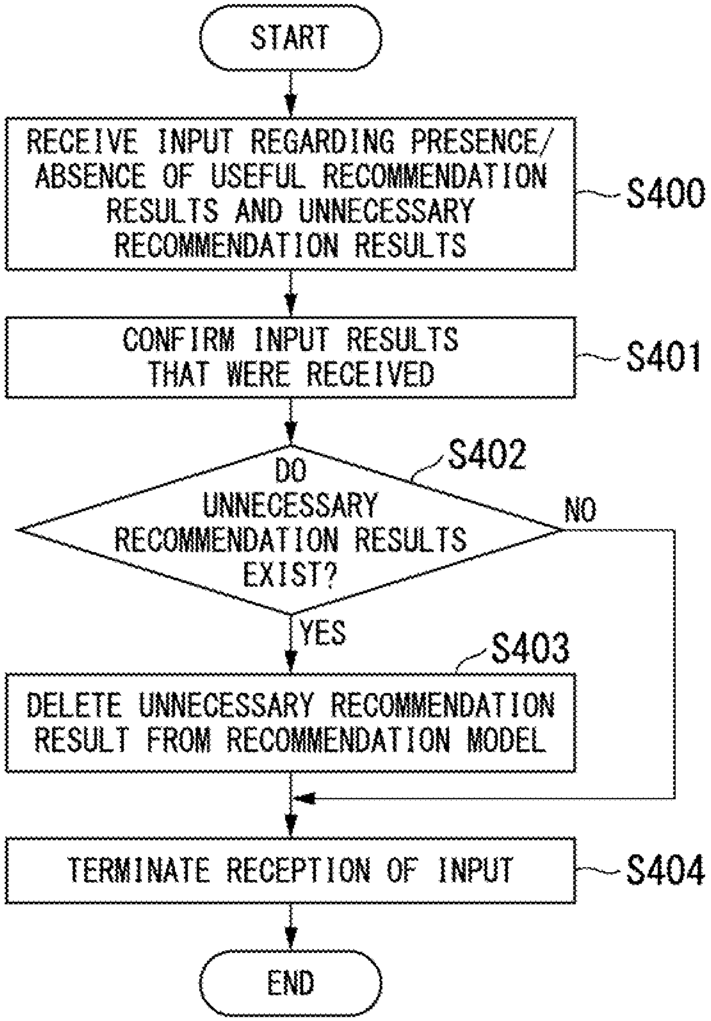
FIG. 7 is a drawing showing a fourth example of the processing flow of the response system according to one embodiment of the present disclosure.
Figures 8, 9:
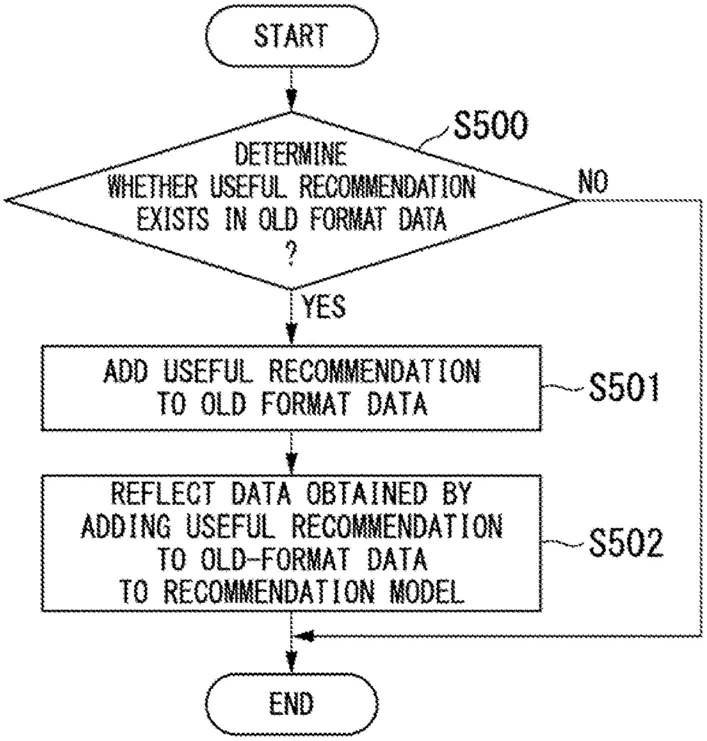
FIG. 8 is a drawing showing a fifth example of the processing flow of the response system according to one embodiment of the present disclosure.
FIG. 9 is a drawing showing an example of the display of how many other events with the same label exist in one embodiment of the present disclosure.

Next, the processes performed by the response system 1 according to one embodiment of the present disclosure will be explained with reference to FIGS. 4 through 8. FIG. 4 is a drawing showing a first example of the processing flow of the response system 1 according to one embodiment of the present disclosure. FIG. 5 is a drawing showing a second example of the processing flow of the response system 1 according to one embodiment of the present disclosure. FIG. 6 is a drawing showing a third example of the processing flow of the response system 1 according to one embodiment of the present disclosure. FIG. 7 is a drawing showing a fourth example of the processing flow of the response system 1 according to one embodiment of the present disclosure. FIG. 8 is a drawing showing a fifth example of the processing flow of the response system 1 according to one embodiment of the present disclosure.

First, referring to FIG. 4, a description shall be given of the procedure to learn the class classifier performed by the response system 1.

The preprocessing portion 110 acquires all of the query texts T10 in the data in the response history DB 20 as question-and-answer data for learning (Step S100). The preprocessing portion 110 performs morphological analysis using all the acquired query texts T10 (question-and-answer data for learning). The first feature extraction portion 120 generates a first sentence vector from the results of the morphological analysis by the preprocessing portion 110 (Step S101).

The class classification model generation portion 130 uses the first sentence vector generated by the first feature extraction portion 120 and the classification T20 (i.e., class label) assigned to the response history DB 20 to learn the class classifier represented by the class classification model 310 (Step S102). The model storage portion 300 records (e.g., in the model storage portion 300) the learned class classifier generated by the class classification model generation portion 130 of the learning portion 100, together with the first sentence vector (Step S103).

The second feature extraction portion 140 divides the learning data for each type of the label indicated by the classification T20. The second feature extraction portion 140 generates the second sentence vector from the morphological analysis result for each of the divided learning data (Step S104). The recommendation model generation portion 150 records the second sentence vector generated by the second feature extraction portion 140 as a recommendation model 320 in the model storage portion 300 (Step S105).

Next, referring to FIG. 5, the procedure for recommending multiple candidates performed by the response system 1 shall be described.

The operator receives new inquiries. The operator operates the terminal device 10 to input new question-and-answer data into the response presentation device 30 in response to the new inquiry received. The terminal device 10 inputs new question-and-answer data to the response presentation device 30 in response to the operation by the operator.

The preprocessing portion 210 acquires new question-and-answer data input to the response presentation device 30 (Step S200). The preprocessing portion 210 performs morphological analysis using the new query text in the acquired question-and-answer data. The first feature extraction portion 220 generates a first sentence vector from the results of morphological analysis by the preprocessing portion 210 (Step S201).

The class classification execution portion 230 loads the class classification model 310 stored in the model storage portion 300 (Step S202). The class classification execution portion 230 inputs the first sentence vector generated by the first feature extraction portion 220 into the loaded class classification model 310 to perform class classification (Step S203).

The recommendation generation portion 250 loads the recommendation model 320 stored in the model storage portion 300 (Step S204). The second feature extraction portion 240 generates the second sentence vector for the new question-and-answer data acquired by the preprocessing portion 210 (Step S205). The recommendation generation portion 250 calculates the similarity between the second sentence vector model corresponding to the class obtained as a result of the execution by the class classification execution portion 230 and the second sentence vector stored in the loaded recommendation model 320 (Step S206). The recommendation generation portion 250 generates the reply text T30 of the response history DB 20 with high similarity as the recommendation information (Step S207).

Note that similarity calculations use cosine similarity, similarity using the Euclidean norm, and the like. Regarding the generation of recommendation information, if there are a plurality of labels of the same class label or labels not used for learning among the top similarities, it is acceptable to present a representative example and display how many other events with the same label exist. FIG. 9 is a drawing showing an example of the display of how many other events with the same label exist in one embodiment of the present disclosure. For example, as shown in part (a) of FIG. 9, if there are three instances of part A, two instances of part B, and one instance of part C as labels, the recommendation generation portion 250 arranges the labels in order of similarity, with the highest similarity in the same label being the similarity of that label. The recommendation generation portion 250 then associates the number of instances of each label with the similarity of each label, as shown in part (b) of FIG. 9. Thus, the recommendation generation portion 250 generates recommendation information in Step S207.

Referring now to FIG. 6, the process performed by the recommendation reason generation portion 260, which generates reasons for recommendation, being information that indicates which words and phrases contributed significantly to the similarity level, shall be described.

First, the process by which the recommendation reason generation portion 260 generates the reason for recommendation, using cosine similarity as an example of similarity, will be described.

The cosine value between vectors a and vectors b is expressed as in Equation (1) above. The recommendation reason generation portion 260 acquires the second sentence vector for the new question-and-answer data as vector a and the second sentence vector generated from the recommendation model 320 as vector b (Step S300). In this case, the recommendation reason generation portion 260 would treat the cosine value as the similarity between sentences.

The recommendation reason generation portion 260 acquires each element of the similarity calculation as each term $a_ib_i$ in the rightmost numerator in Equation (1) (Step S301). Here, attention is paid to each term $a_ib_i$ of the numerator on the right-hand side of Equation (1). The subscript i in each term $a_ib_i$ represents the element number of the vector. Each term $a_ib_i$ corresponds to a word or phrase such as "BIOS," "setting," "how to enter," etc., in the case of a sentence vector such as TF-IDF. The recommendation reason generation portion 260 rearranges the element numbers, which are each term $a_ib_i$, in order of numerical value (i.e., contribution) (Step S302). Then, the recommendation reason generation portion 260 generates the words and phrases corresponding to each term $a_ib_i$ after rearranging and the numerical values of those terms (e.g., in tabular form) as recommendation information (Step S303). The recommendation reason generation portion 260 presents the top words with the highest numerical value (i.e., the highest contribution) (Step S304). The recommendation reason generation portion 260 can generate this term as a contribution ratio by displaying the numerical value of this term divided by the cosine value.

Figure 10:
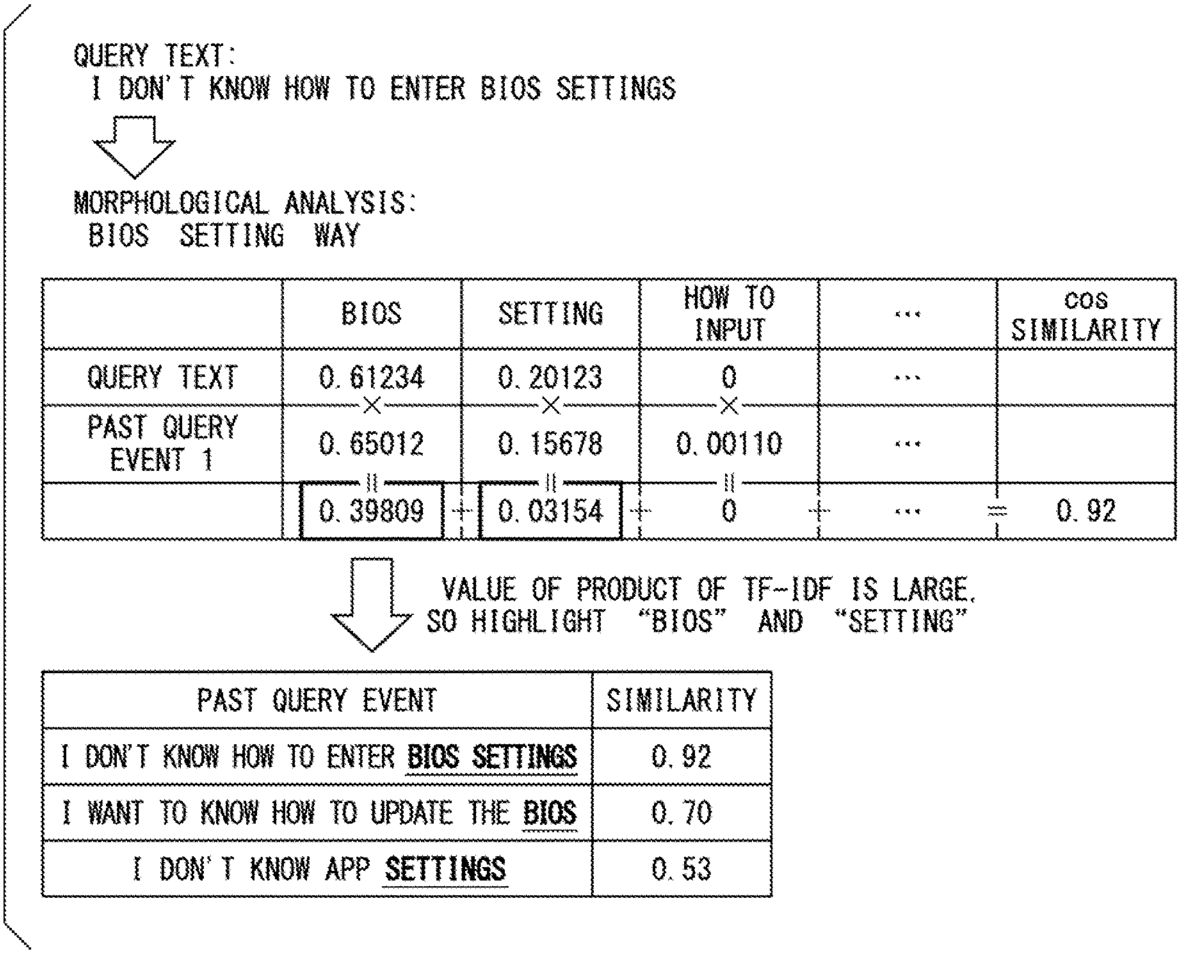
FIG. 10 is a drawing showing an example of the words and phrases corresponding to each term $a_i b_i$ after rearranging and the numerical value of that term in one embodiment of the present disclosure.

FIG. 10 is a diagram showing an example of the words and phrases corresponding to each term $a_ib_i$ and the numerical value of that term after the rearranging in one embodiment of the present disclosure. In the example shown in FIG. 10, the words and phrases corresponding to the terms in order of increasing similarity are arranged as "I don't know how to enter BIOS settings," "I want to know how to update the BIOS," and "I don't know the settings of application programs (in FIG. 10, it says "I don't know app settings")", and the similarity values are generated along with these words and phrases.

Next, the process performed by the recommendation reason generation portion 260, using the Euclidean norm as an example of similarity, will be described.

The Euclidean norm between vectors a and b is expressed as in the aforementioned Equation (2). The recommendation reason generation portion 260 acquires vector a as the second sentence vector for the new question-and-answer data and vector b as the second sentence vector generated from the recommendation model 320 (the process corresponding to Step S300). In this case, the recommendation reason generation portion 260 would treat the Euclidean norm as the similarity between sentences.

The recommendation reason generation portion 260 acquires each term $(a_i-b_i)^2$ on the right side in the Equation (2) (the process corresponding to Step S301). Unlike the case of cosine similarity, the smaller the value of the Euclidean norm, the closer the distance between vectors a and b. Therefore, the smaller the value of the Euclidean norm, the higher the similarity. Therefore, words and phrases with a low value of $(a_i-b_i)^2$ and corresponding to $a_i \neq 0$ and $b_i \neq 0$ are words and phrases with a high degree of contribution to the degree of similarity. The recommendation reason generation portion 260 rearranges each term $(a_i-b_i)^2$ in numerical order of decreasing value (process corresponding to Step S302). Then, the recommendation reason generation portion 260 generates the words and phrases corresponding to each term $(a_i-b_i)^2$ after rearranging and the numerical values of the terms (e.g., in the form of a table) as recommendation information (process corresponding to Step S303). The recommendation reason generation portion 260 presents the top words with the lowest numerical value (i.e., the highest contribution) (process corresponding to Step S304).

Following the process of Step S303 (or the process corresponding to Step S303), the recommendation output portion 270 formats the recommendation information generated by the recommendation generation portion 250 and the recommendation reason generation portion 260 and outputs the formatted recommendation information as a recommendation result. FIG. 11 is a drawing showing an example of a recommendation result in one embodiment of the present disclosure. For example, by formatting the recommendation information, the recommendation output portion 270 outputs, in order of similarity (referred to as "similarity ranking" in FIG. 11), the numerical value of the similarity (referred to as "similarity" in FIG. 11), the past query content (referred to as "past query content" in FIG. 11), and the treatment content regarding that query content (referred to as "treatment content" in FIG. 11) to the terminal device 10 as recommendation results.

Referring now to FIG. 7, the processes performed by the unnecessary recommendation deletion reception portion 400 and the unnecessary recommendation deletion reflection portion 410 regarding model updates shall be described.

The operator receives the recommendation results output by the recommendation output portion 270 via the terminal device 10. The operator checks the recommendation results and performs an operation on the terminal device 10 to select the recommendation results that were useful and those that were unnecessary. Examples of unnecessary recommendation results include reply texts like "I don't know" as past recommendation results, and reply texts that were recommended in the past before the content was improved. The unnecessary recommendation deletion reception portion 400 receives input regarding the presence or absence of useful and unnecessary recommendation results in response to an operator operation (Step S400). The unnecessary recommendation deletion reflection portion 410 confirms the input results received from the terminal device 10 (Step S401). The unnecessary recommendation deletion reflection portion 410 determines whether unnecessary recommendation results exist (Step S402). If an unnecessary recommendation result exists (YES in Step S402), the unnecessary recommendation deletion reflection portion 410 deletes the unnecessary recommendation result from the recommendation model 320 (step S403). Then, the unnecessary recommendation deletion reflection portion 410 terminates the reception of input from the terminal device 10 (Step S404). If there are no unnecessary recommendation results (NO in Step S402), the unnecessary recommendation deletion reception portion 400 proceeds to Step S404. This allows the operator to know via the terminal device 10 which words and phrases contributed to the recommendation, since the words and phrases are arranged and presented in order of similarity.

In one embodiment of the present disclosure, a single input was used to determine useful and unnecessary recommendation results. However, if a recommendation result of the same content is output many times but the recommendation result is not determined to be useful a predetermined number of times (e.g., N times), the learning data for that recommendation result may be deleted from the recommendation model 320. The predetermined number of times N may be set as a variable parameter.

The learning data for recommendation results selected by the operator as being unnecessary may be immediately deleted from the recommendation model 320.

It is not limited to either of the above two methods, and both methods can be used to delete unnecessary learning data from the recommendation model 320 and update the recommendation model 320.

Referring to FIG. 8, a procedure for updating the recommendation model 320 in order to update the data format performed by the model format update reception portion 420 shall be described next.

The recommendation model 320 is generated as a learned model by being trained using old format data (the most recent data in the past). After the reply texts of past cases are recommended according to the similarity by the model generated with the old format data, the operator 10 checks the recommendation results and performs, on the model format update reception portion 420, an operation to input the recommendation that is useful. The model format update reception portion 420 determines whether or not a useful recommendation exists in the old format data (Step S500). If the model format update reception portion 420 determines that a useful recommendation exists in the old format data (YES in Step S500), it terminates the process. The model format update reception portion 420, upon determining that a useful recommendation does not exist in the old format data (NO in Step S500), adds that useful recommendation to the old format data (Step S501). Then, the model format update reception portion 420 reflects the data obtained by adding useful recommendations to old-format data to the recommendation model 320 in the model storage portion 300 as new format data (the most recent data after adding useful recommendations, which will be the data in the old format in the next Step S500) (Step S502). In this way, events with a track record of recommendation and have been useful will be preferentially updated to the new format. It will be possible to re-generate a new model at the same time the data in the new format is accumulated.

In one embodiment of the present disclosure, the response presentation device is described as an independent device, but each function may be provided as a program. For example, the response presentation device 30 may be realized by installing a program on an operation management server (an example of a computer) or the like, installing it on a terminal/tablet terminal or client PC (personal computer, an example of a computer) used by the operator 10, or installing it on a virtual server (an example of a computer) in the cloud.

The above is a description of the response system 1 according to one embodiment of the present disclosure. In the response system 1 (an example of a processing device), the first processing portion generates a first sentence vector including a vector about the query text for all learning data including the query text, the label, and the reply text, and generates, based on the first sentence vector, a first model that outputs a label corresponding to the input query text when the query text is input. The second processing portion divides all the learning data by each label, generates a second sentence vector, including vectors for each word, about the query text included in the learning data divided for each label, and makes the second sentence vector the second model. The third processing portion presents a recommended reply text for a new query text and a reason for recommendation of the recommended reply text based on the first model and the second model.

This response system 1 can present recommended reply texts and recommendation reasons of the recommended reply texts, and the operator can use the understanding of the recommendation reasons as criteria for determining the validity and certainty of the recommended replies. This allows the operator to execute a more appropriate reply to the questioner based on the recommended reply text. As a result, the response system 1 reduces the likelihood that an operator will give an inappropriate reply when presenting a response to a query.

In addition, the response system 1 according to one embodiment of the present disclosure described above can eliminate data that the operator determines to be unnecessary, reducing the possibility that the model will recommend meaningless reply texts without relearning.

In addition, with the response system 1 according to one embodiment of the present disclosure, even when an appropriate reply text cannot be obtained for a new query text with old-format data based on past data, data obtained by adding useful recommendations to the old format data can be reflected in the model by making it a new format data. This results in more appropriate replies to new queries.

Part or all of the response system 1 according to each embodiment of the present disclosure may be installed in a call center. Part or all of the response system 1 according to each embodiment of the present disclosure may also be introduced into help desk operations.

In another embodiment of the present disclosure, the classification T20 may be a further subdivided classification item, and the class classifier generated by the class classification model generation portion 130 may be not one but multiple (e.g., performing two levels of classification) class classifiers.

FIG. 12 is a drawing showing the minimum configuration of the processing device 500 according to an embodiment of the present disclosure. The processing device 500 is provided with a first processing means 501, a second processing means 502, and a third processing means 503, as shown in FIG. 12. The first processing means 501 generates a first sentence vector including a vector about the query text for all learning data including the query text, the label, and the reply text, and generates, on the basis of the first sentence vector, a first model that outputs a label corresponding to the input query text when the query text is input. The second processing means 502 divides all the learning data by each label, generates a second sentence vector, including vectors for each word, about the query text included in the learning data divided for each label, and makes the second sentence vector the second model. The third processing means 503 generates, based on the first model and the second model, a recommended reply text for a new query text and a reason for recommendation of the recommended reply text, and presents the recommended reply text and recommendation reason that were generated. The first processing means 501 can be realized, for example, using the functions possessed by the preprocessing portion 110, the first feature extraction portion 120, and the class classification model generation portion 130, each of which is illustrated in FIG. 1. The second processing means 502 can be realized, for example, using the functions possessed by the second feature extraction portion 140 and the recommendation model generation portion 150 illustrated in FIG. 1. The third processing means 503 can be realized, for example, using the functions possessed by the recommendation generation portion 250 and the recommendation reason generation portion 260 illustrated in FIG. 1.

Figure 13:
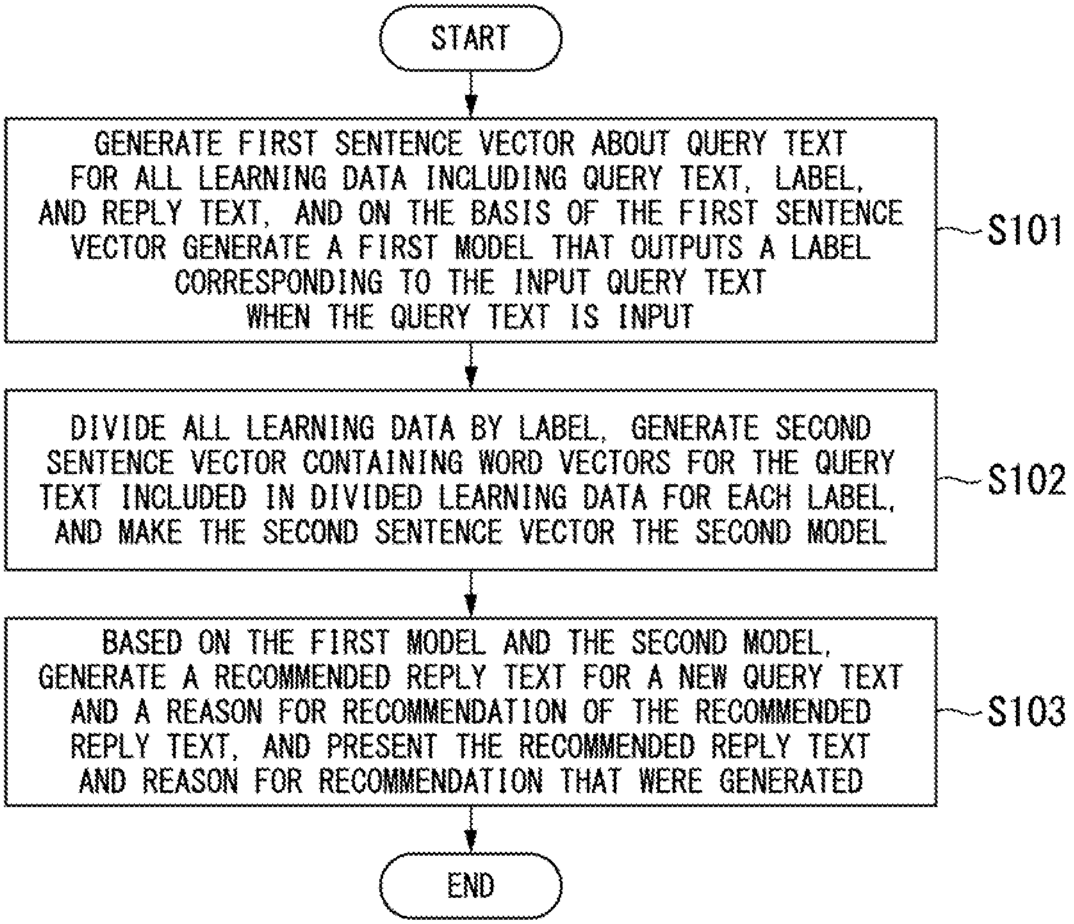
FIG. 13 is a drawing showing an example of the processing flow of a processing device of the minimum configuration according to the embodiment of the present disclosure.

FIG. 13 is a drawing showing an example of the processing flow of a processing device 500 of the minimum configuration according to the embodiment of the present disclosure. Next, the processing of the processing device 500 of the minimum configuration according to the embodiment of the present disclosure is described with reference to FIG. 13.

The first processing means 501 generates a first sentence vector including a vector about the query text for all learning data including the query text, the label, and the reply text, and generates, on the basis of the first sentence vector, a first model that outputs a label corresponding to the input query text when the query text is input (Step S101). The second processing means 502 divides all the learning data by each label, generates a second sentence vector, including vectors for each word, about the query text included in the learning data divided for each label, and makes the second sentence vector the second model (Step S102). The third processing means 503 generates, based on the first model and the second model, a recommended reply text for a new query text and a reason for recommendation of the recommended reply text, and presents the recommended reply text and recommendation reason that were generated (Step S103).

The above is a description of the minimum-configuration processing device 500 according to the embodiment of the present disclosure. This processing device 500 reduces the likelihood that an operator will give an inappropriate reply when presenting a response to a query.

Note that in the embodiment of the present disclosure, the order of processing may be changed as long as appropriate processing is performed within the scope of the present disclosure.

Although the embodiments of the present disclosure have been described, the above-mentioned response system 1, terminal device 10, response history DB 20, response presentation device 30, learning portion 100, recommendation portion 200, and other control devices may have internal computer systems. The above-mentioned process is stored in a computer-readable recording medium in the form of a program, and by the computer reading and executing this program, the aforementioned process is performed. Specific examples of computers are shown below.

Figure 14:
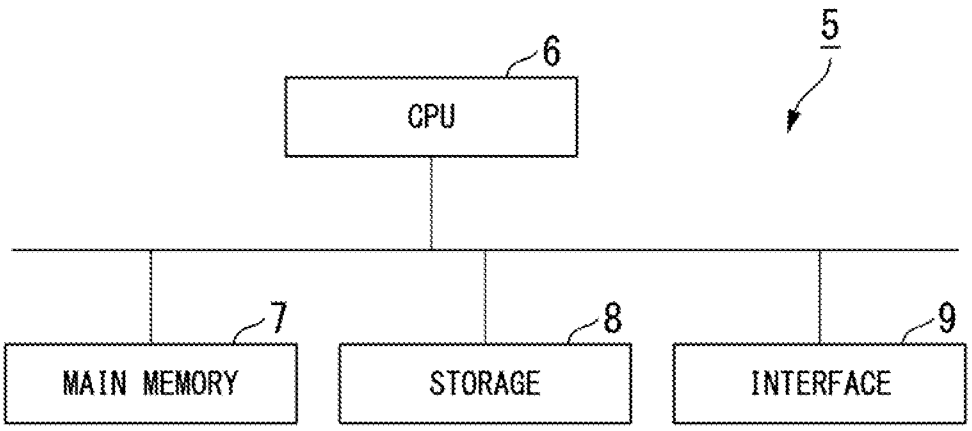
FIG. 14 is a schematic block diagram of a computer according to at least one embodiment.

FIG. 14 is a schematic block diagram of a computer according to at least one embodiment. A computer 5 is provided with a CPU 6, a main memory 7, storage 8, and an interface 9, as shown in FIG. 14. For example, each of the above-mentioned response system 1, terminal device 10, response history DB 20, response presentation device 30, learning portion 100, recommendation portion 200, and other control devices are implemented in the computer 5. The operations of each processing portion described above are stored in the storage 8 in the form of a program. The CPU 6 reads the program from the storage 8, deploys it into the main memory 7, and executes the above processing according to the program. The CPU 6 also allocates storage areas corresponding to each of the above-mentioned storage portions in the main memory 7 according to the program.

Examples of the storage 8 include an HDD (Hard Disk Drive), an SSD (Solid State Drive), a magnetic disk, an optical disk, a CD-ROM (Compact Disc Read Only Memory), a DVD-ROM (Digital Versatile Disc Read Only Memory), and a semiconductor memory. The storage 8 may be internal media directly connected to the bus of the computer 5 or external media connected to the computer 5 via an interface 9 or communication lines. If this program is delivered to the computer 5 via a communication line, the computer 5 that receives the delivery may deploy the program into its main memory 7 and execute the above process. In at least one embodiment, the storage 8 is a non-temporary tangible storage medium.

The above program may also realize some of the aforementioned functions. Furthermore, the above program may be a so-called differential file (differential program) that realizes the aforementioned functions in combination with a program already recorded in the computer system.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

Some or all of the above embodiments may also be described as, but not limited to, the following supplementary notes.

(Supplementary Note 1)

A processing device provided with:

- a first processing portion that, for learning data including a query text, label and reply text, generates a first sentence vector including a vector about the query text, and generates, based on the first sentence vector, a first model that, when the query text is input, outputs a label corresponding to the input query text;
- a second processing portion that divides the learning data for each label, generates a second sentence vector, including vectors for each word, about the query text included in the divided learning data for each label, and makes the second sentence vector a second model; and
- a third processing portion that generates, based on the first model and the second model, a recommended reply text to a new query text and a reason for recommendation of the recommended reply text, and presents the recommended reply text and the reason for recommendation that were generated.

(Supplementary Note 2)

The processing device according to Supplementary Note 1, wherein

- the second processing portion calculates, based on the second model, similarity between the query text included in the divided learning data for each label and the new query text, and
- the third processing portion presents the recommended reply text and the reason for recommendation based on the similarity.

(Supplementary Note 3)

The processing device according to Supplementary Note 1 or 2, wherein

- the second processing portion calculates the similarity between the vectors for each word in the query text included in the divided learning data for each label and the vectors for each word in the new query text, using cosine similarity or Euclidean norm, and
- the third processing portion presents the words in the order of contribution to the similarity calculated by the second processing portion as the reason for recommendation.

(Supplementary Note 4)

The processing device according to any one of supplementary notes 1 to 3, provided with:

a fourth processing portion that deletes data related to unnecessary reply text and the reason for recommendation from the learning data, among the recommended reply texts and the reasons for recommendation.

(Supplementary Note 5)

The processing device according to any one of supplementary notes 1 to 4, provided with:

a fifth processing portion that adds a useful reply text and the reason for recommendation to the first model and the second model, among the recommended reply texts and the reasons for recommendation.

(Supplementary Note 6)

A processing method including the steps of:

generating, for learning data including a query text, label and reply text, a first sentence vector including a vector about the query text, and generating, based on the first sentence vector, a first model that, when the query text is input, outputs a label corresponding to the input query text;

dividing the learning data for each label, generating a second sentence vector, including vectors for each word, about the query text included in the divided learning data for each label, and making the second sentence vector a second model; and generating, based on the first model and the second model, a recommended reply text to a new query text and a reason for recommendation of the recommended reply text, and presenting the recommended reply text and the reason for recommendation that were generated.

(Supplementary Note 7)

A program for causing a computer to execute the steps of:

generating, for learning data including a query text, label and reply text, a first sentence vector including a vector about the query text, and generating, based on the first sentence vector, a first model that, when the query text is input, outputs a label corresponding to the input query text;

dividing the learning data for each label, generating a second sentence vector, including vectors for each word, about the query text included in the divided learning data for each label, and making the second sentence vector a second model; and generating, based on the first model and the second model, a recommended reply text to a new query text and a reason for recommendation of the recommended reply text, and presenting the recommended reply text and the reason for recommendation that were generated.

As mentioned above, when presenting a response corresponding to a query, as is the case with the device described in Patent Document 1, an operator who replies in accordance with the presentation will be replying on the basis of the recommended reply text. However, since the operator replies without knowing the reason why the reply text was recommended, the likelihood of an inappropriate reply increases. Therefore, there is a requirement for technology that can reduce the possibility of an operator giving an inappropriate reply when presenting a response to a query.

According to each of the aspects of the present disclosure, for example, when presenting a response to a query, the possibility of an inappropriate reply by the operator can be reduced.

What is claimed is:

1. A processing device comprising:

at least one memory configured to store instructions; and at least one processor configured to execute the instructions to:

generate, for learning data including a query text, label and reply text, a first sentence vector including a vector about the query text, and generate, based on the first sentence vector, a first model that, when the query text is input, outputs a label corresponding to the input query text;

divide the learning data for each label, generate a second sentence vector, including vectors for each word, about the query text included in the divided learning data for each label, and make the second sentence vector a second model;

acquire one or more labels for a new query text based on the first model;

calculate, for the one or more labels that are acquired, similarities for each word between second models, including the second model and corresponding to the one or more labels, and the second sentence vector, including the vectors for each word, about the new query text, and calculate similarity scores, each indicating a sum of the similarities; and generate, based on the calculated similarity scores, a recommended reply text to the new query text and a reason for recommendation of the recommended reply text, and present the recommended reply text and the reason for recommendation that were generated.

2. The processing device according to claim 1, wherein the at least one processor is configured to:

calculate the similarities between the vectors for each word in a plurality of query texts included in the divided learning data corresponding to the one or more labels and the vectors for each word in the new query text, using cosine similarity or Euclidean norm; and present words in an order of contribution to a calculated similarity score as the reason for recommendation.

3. The processing device according to claim 1, wherein the at least one processor is further configured to delete data related to unnecessary reply text and the reason for recommendation from the learning data, among recommended reply texts and reasons for recommendation.

4. The processing device according to claim 1, wherein the at least one processor is further configured to add a useful reply text and the reason for recommendation to the first model and the second model, among recommended reply texts and reasons for recommendation.

5. A processing method comprising:

generating, for learning data including a query text, label and reply text, a first sentence vector including a vector about the query text, and generating, based on the first sentence vector, a first model that, when the query text is input, outputs a label corresponding to the input query text;

dividing the learning data for each label, generating a second sentence vector, including vectors for each word, about the query text included in the divided learning data for each label, and making the second sentence vector a second model;

acquiring one or more labels for a new query text based on the first model;

calculating, for the one or more labels that are acquired, similarities for each word between second models, including the second model and corresponding to the one or more labels, and the second sentence vector, including the vectors for each word, about the new query text, and calculating similarity scores, each indicating a sum of the similarities; and generating, based on the calculated similarity scores, a recommended reply text to the new query text and a reason for recommendation of the recommended reply text, and presenting the recommended reply text and the reason for recommendation that were generated.

6. A non-transitory computer-readable storage medium that stores a program that causes a computer to execute processes, the processes comprising:

generating, for learning data including a query text, label and reply text, a first sentence vector including a vector about the query text, and generating, based on the first sentence vector, a first model that, when the query text is input, outputs a label corresponding to the input query text;

dividing the learning data for each label, generating a second sentence vector, including vectors for each word, about the query text included in the divided learning data for each label, and making the second sentence vector a second model;

acquiring one or more labels for a new query text based on the first model;

calculating, for the one or more labels that are acquired, similarities for each word between second models, including the second model and corresponding to the one or more labels, and the second sentence vector, including the vectors for each word, about the new query text, and calculating similarity scores, each indicating a sum of the similarities; and generating, based on the calculated similarity scores, a recommended reply text to the new query text and a reason for recommendation of the recommended reply text, and presenting the recommended reply text and the reason for recommendation that were generated.

7. The processing device according to claim 1, wherein the at least one processor is further configured to:

generate the reason for recommendation of the recommended reply text, including information representing an association a similarity score with words included in the recommended reply text.

8. The processing device according to claim 1, wherein the at least one processor is further configured to:

present the one or more labels in order of a highest similarity score among the calculated similarity scores.

9. The processing device according to claim 1, wherein the at least one processor is further configured to:

present the one or more labels by associating each label with a number of instances of each label and a similarity score.

10. The processing device according to claim 1, wherein the at least one processor is further configured to:

generate, as the reason for recommendation of the recommended reply text, information including combinations of the new query text and the recommended reply text, along with the corresponding the similarity scores for each combination.

11. The processing device according to claim 1, wherein the at least one processor is further configured to:

perform first morphological analysis on the query text, and generate the first sentence vector including the vector about the query text based on a result of the first morphological analysis; and perform second morphological analysis on the query text included in the divided learning data for each label, and generate the second sentence vector based on a result of the second morphological analysis.

12. The processing device according to claim 1, wherein the at least one processor is configured to:

generate the recommended reply text to the new query text, which is input in response to an operation on a terminal device by an operator, and present the recommended reply text and the reason for recommendation to the terminal device for the operator to review.

* * * * *